(12) United States Patent
Suwa et al.

(10) Patent No.: US 11,398,055 B2
(45) Date of Patent: Jul. 26, 2022

(54) COLOR EVALUATION DEVICE, COLOR EVALUATION METHOD, AND INDICATION OBJECT USED IN COLOR EVALUATION METHOD

(71) Applicant: HITACHI, LTD., Tokyo (JP)

(72) Inventors: Yuji Suwa, Tokyo (JP); Kohhei Aida, Tokyo (JP); Shunsuke Mori, Tokyo (JP); Shigetaka Tsubouchi, Tokyo (JP); Masahiro Kawasaki, Tokyo (JP); Yoshifumi Sekiguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 71 days.

(21) Appl. No.: 17/252,857

(22) PCT Filed: Mar. 20, 2019

(86) PCT No.: PCT/JP2019/011936
§ 371 (c)(1),
(2) Date: Dec. 16, 2020

(87) PCT Pub. No.: WO2020/049779
PCT Pub. Date: Mar. 12, 2020

(65) Prior Publication Data
US 2021/0158574 A1 May 27, 2021

(30) Foreign Application Priority Data
Sep. 3, 2018 (JP) .............................. JP2018-164226

(51) Int. Cl.
*G06T 7/90* (2017.01)
(52) U.S. Cl.
CPC ...... *G06T 7/90* (2017.01); *G06T 2207/10024* (2013.01)

(58) Field of Classification Search
CPC ... G06T 7/90; G06T 2207/10024; G06T 1/00; G01J 3/0264; G01J 3/0272; G01J 3/462;
(Continued)

(56) References Cited

U.S. PATENT DOCUMENTS 5,953,449 A * 9/1999 Matsuda .............. G01K 11/165
382/167
2007/0223064 A1 9/2007 Ichitani
(Continued)

FOREIGN PATENT DOCUMENTS

JP 2004-135069 A 4/2004
JP 2007-101482 A 4/2007
(Continued)

OTHER PUBLICATIONS

Japanese Office Action dated Mar. 15, 2022 for Japanese Patent Application No. 2018-164226.

*Primary Examiner* — Christopher Wait
(74) *Attorney, Agent, or Firm* — Volpe Koenig

(57) ABSTRACT

A calculation device comprises a color evaluation unit that acquires a sensor color and four or more reference colors from photography data from a measurement time when an indication object was photographed in a second photography environment; determines coefficients for color conversion between a first and the second photography environments based on the amount of change from color information for the reference colors in the first photography environment, which has been read from a calculation device storage unit, to color information for the reference colors in the second photography environment, which has been acquired from the photography data; and uses the sensor color acquired from the photography data from the measurement time and the color conversion coefficients to correct the sensor color to the color that would have been photographed in the first
(Continued)

photography environment by solving a conversion formula including terms representing an affine transformation consisting of translation.

10 Claims, 7 Drawing Sheets

(58) Field of Classification Search
CPC .... G01J 3/50; G01J 3/524; G01J 3/52; G01N 21/81; G01N 21/27; G01K 11/12; H04N 1/60
See application file for complete search history.

(56) References Cited

U.S. PATENT DOCUMENTS

| | | |
|---|---|---|
| 2012/0236308 A1 | 9/2012 | Satoh |
| 2015/0241358 A1 | 8/2015 | Burg et al. |
| 2015/0304618 A1 | 10/2015 | Iwamura et al. |
| 2018/0080829 A1 | 3/2018 | Tanimura et al. |

FOREIGN PATENT DOCUMENTS

| | | |
|---|---|---|
| JP | 2007-259123 A | 10/2007 |
| JP | 2010-281728 A | 12/2010 |
| JP | 2012-093277 A | 5/2012 |
| JP | 2012-209939 A | 10/2012 |
| JP | 2015-207085 A | 11/2015 |
| WO | 2016-163266 A1 | 10/2016 |

* cited by examiner

FIG. 9

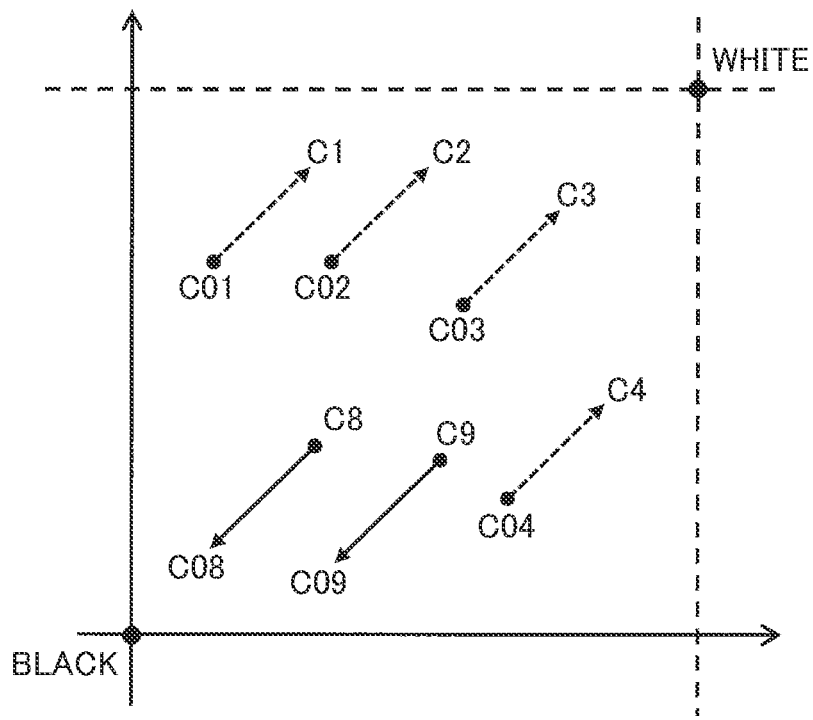

| FIRST PHOTOGRAPHY ENVIRONMENT | SECOND PHOTOGRAPHY ENVIRONMENT |
|---|---|
| REFERENCE STANDARD COLOR C01[$R_{01}$, $G_{01}$, $B_{01}$] | REFERENCE PHOTOGRAPHED COLOR C1[$R_1$, $G_1$, $B_1$] |
| REFERENCE STANDARD COLOR C02[$R_{02}$, $G_{02}$, $B_{02}$] | REFERENCE PHOTOGRAPHED COLOR C2[$R_2$, $G_2$, $B_2$] |
| REFERENCE STANDARD COLOR C03[$R_{03}$, $G_{03}$, $B_{03}$] | REFERENCE PHOTOGRAPHED COLOR C3[$R_3$, $G_3$, $B_3$] |
| REFERENCE STANDARD COLOR C04[$R_{04}$, $G_{04}$, $B_{04}$] | REFERENCE PHOTOGRAPHED COLOR C4[$R_4$, $G_4$, $B_4$] |
| SENSOR CORRECTED COLOR C08[$R_C$, $G_C$, $B_C$] | SENSOR PHOTOGRAPHED COLOR C8[R, G, B] |
| SENSOR CORRECTED COLOR C09[$R_C$, $G_C$, $B_C$] | SENSOR PHOTOGRAPHED COLOR C9[R, G, B] |

COLOR EVALUATION DEVICE, COLOR EVALUATION METHOD, AND INDICATION OBJECT USED IN COLOR EVALUATION METHOD

TECHNICAL FIELD

The present invention relates to a color evaluation device, a color evaluation method, and an indication object used in the color evaluation method.

BACKGROUND ART

An indication object, such as a scrap of paper, colored with color ink (temperature-detecting ink) changes its color to indicate a measured value as a result of measurement (sensing) of physical quantity. A color sensor is used for a measurement object when a measured value of the object is difficult to be converted into an electric signal, or is used in response to a demand for sensing at low cost.

The color sensor typically shows an intermediate color between a non-discolored state and a most discolored state. Visual color check is enough for acquiring a rough measured value. When an accurate measured value is desired to be mechanically obtained, a color evaluation device is required to read a sensed intermediate color of a color sensor and convert the intermediate color to a quantitative digital value (hereinafter, referred to as "color evaluation").

The color evaluation device acquires color information from a photographed image of the color sensor. Since the acquired image is typically strongly affected by photography environment and photography equipment, the intermediate color is less likely to be accurately evaluated. Examples of the photography environment affecting the image include a light source type and brightness. A spectrum of light impinging on a subject varies depending on a light source type (illumination type) such as direct sunlight, outside light in cloudy weather, a fluorescent lamp, and an incandescent bulb, or on an attenuation level of light from the light source.

A plurality of light sources often exist, and light from such light sources may be mixedly applied. It is quite common that a location or a direction of the sensor or a standing position of a photographer varies depending on a photography situation. Furthermore, photography time (position of the sun) or weather continuously varies. Such factors vary brightness and a spectrum of illumination impinging on the sensor as a photography object.

Patent literature 1 describes a measurement device including analysis means to obtain a corrected value of a color sample from color image data obtained by simultaneously imaging a color sensor changeable in its color and a three-color color sample, and correction means to correct the color of the color sensor using the corrected value.

Consequently, even if the color sensor is imaged under various light sources, the color of the color sensor can be corrected using the color sample photographed in the same image.

CITATION LIST

Patent Literature

Patent literature 1: Japanese Unexamined Patent Application Publication No. 2012-93277.

SUMMARY OF INVENTION

Technical Problem

The three-color color sample is used for color correction in patent literature 1. Thus, when a sensor color is corrected by coordinate transformation in a color space, the method of patent literature 1 allows only linear transformation with an origin unmoved, and does not allow affine transformation including translation.

Thus, even if correction is performed through rotation with the origin of the linear transformation as the center, since the coordinates of the sensor color are close to the origin in a color space particularly when a photographed sensor color is close to black, correction amount for the photographed color is small, resulting in insufficient improvement in correction accuracy. For example, the entire image is frequently photographed somewhat whitish depending on an illumination angle in actual photography environment, and thus a sensor color originally having a black color may be photographed somewhat whitish.

The subject matter of the invention is to accurately obtain measured values from a color sensor photographed under various photography environments.

Solution to Problem

To solve the above-described problem, a color evaluation device of the invention has the following features.

That is, the color evaluation device is characterized by having a color evaluation unit. A storage unit stores color information of four or more reference colors photographed in a first photography environment.

The color evaluation unit acquires a sensor color of a color sensor, which changes depending on a physical quantity to be measured, and the four or more reference colors, which are unaffected by the physical quantity, from photography data at measurement obtained by photographing an indication object indicating the sensor color and the four or more reference colors in a second photography environment, determines conversion coefficients of colors between the first and second photography environments based on the amount of change from the color information of the four or more reference colors in the first photography environment read from the storage unit to the color information of the four or more reference colors in the second photography environment acquired from the photography data, and calculates a conversion formula including a term representing translation of affine transformation based on the sensor color acquired from the photography data at measurement and the color conversion coefficient to correct the sensor color as if being photographed in the first photography environment.

Other means are described later.

Advantageous Effects of Invention

According to the invention, a measured value can be accurately obtained from the color sensor photographed under various photography environments.

BRIEF DESCRIPTION OF DRAWINGS

FIG. 9 is a schematic illustration of a concept of color correction according to the embodiment of the invention.

DESCRIPTION OF EMBODIMENTS

One embodiment of the invention is now described in detail with reference to the drawings.

Figure 1:
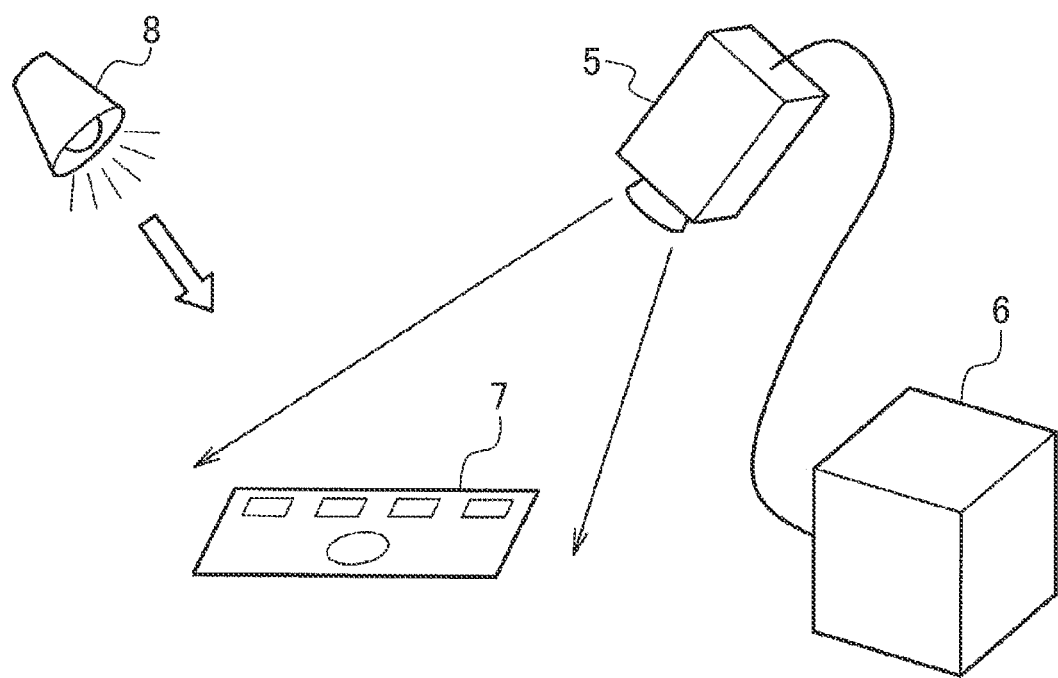
FIG. 1 is a block diagram of a color evaluation system according to one embodiment of the invention.

FIG. 1 is a block diagram of a color evaluation system.

The color evaluation system includes a photography equipment 5 to photograph the entire indication object 7 on which illumination 8 impinges, and a calculation device 6 connected to the photography equipment 5 so as to read a photographed image of the indication object 7 and evaluate a color of the image.

The calculation device 6 operating as a color evaluation device includes a versatile personal computer or server. The photography equipment 5 is a simple equipment such as, for example, a digital camera, a cellular phone with a camera, and a smartphone with a built-in camera.

The photographed image may be transferred from the photography equipment 5 to the calculation device 6 through wired or wireless connection or connection via internet. Data transfer via an SD memory card may be considered as a type of connection.

For example, the indication object 7 may be beforehand prepared in a form of a single card, a panel, a label, a plate, or a mount, may be pasted in a form of a seal on a surface of a box or bag at the point of measurement, or may be externally printed. Any material is optionally used for a surface of the indication object 7. In addition, "indication" may include herein not only indication (printing) by depositing ink on the surface of the indication object 7 and fixing a color, (i.e., not only an indication object such as a paper scrap), but also indication (electrical coloring) of coloring a surface of a panel by transmitting light through liquid crystal molecules of a display of the indication object 7.

The illumination 8 may be natural light or artificial illumination.

Figure 2:
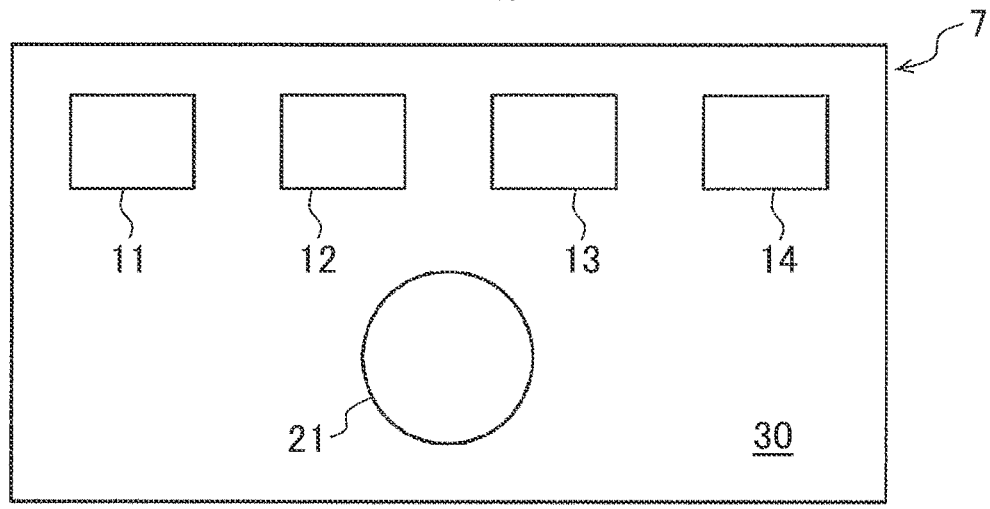
FIG. 2 is a schematic illustration of regions of an indication object according to the embodiment of the invention.

FIG. 2 is a schematic illustration of regions of the indication object 7. FIG. 2 is described while the inside of each region is intentionally uncolored to explain a layout where the indication object 7 is partitioned into a plurality of regions. One indication object 7 is partitioned into a plurality of reference color regions 11 to 14 being closed, one sensor region 21 being closed, and a background region 30 other than such closed regions.

In the sensor region 21, "sensor color" of the color sensor changes depending on measurement results.

The reference color regions 11 to 14 are each colored in "reference color". The reference color is used to determine a conversion coefficient (see FIG. 9 for details) indicating the change amount of the sensor color depending on the photography environment such as the illumination 8.

Although the photography equipment 5 in FIG. 1 has been described so as to photograph the entire indication object 7, the indication object 7 may be photographed in a strict sense such that all the reference color regions 11 to 14 and one sensor region 21 are within one image. Thus, the reference color regions 11 to 14 may be disposed so as to be in the vicinity of the sensor region 21 instead of being located in a row on the upper side of the sensor region 21 as illustrated in FIG. 2.

Shapes of the regions of the indication object 7 are designed such that the reference color regions 11 to 14 each have a rectangular shape while the sensor region 21 has a circular shape, and thus the sensor region 21 can be immediately and visually identified. The regions may each have any shape without being limited to the rectangular shape or the circular shape.

Each region of the indication object 7 may have area to the extent that the region can be represented by a plurality of pixels when being imaged and the average of color values can be calculated.

Figure 3:
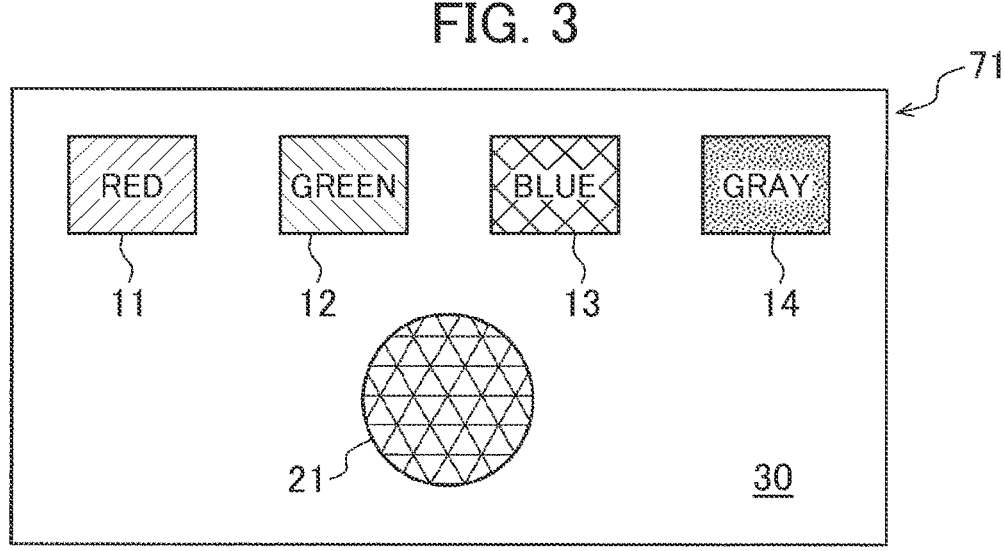
FIG. 3 is a schematic illustration of a result of coloring the indication object of FIG. 2 according to the embodiment of the invention.

FIG. 3 is a schematic illustration of a result of coloring the indication object 7 of FIG. 2.

The sensor region 21 of an indication object 71 is covered with a color sensor such as temperature-detecting ink changeable in its color depending on temperature. This means that the sensor region 21 changes its color to reflect the environment. For example, the sensor region 21 reflects, as color information, results of sensing environmental conditions such as temperature, a temperature history, humidity, light, and concentrations of various gases, and results of sensing pH of a liquid, concentrations of various ions, concentrations of various medicines, concentrations of various amino acids or proteins, and existence of virus or bacterial.

This embodiment is described using an RGB (red, green, blue) model as a color model. In the RGB model, a color of one pixel composing an image is expressed by a combination of values from 0 as a darkest value to 255 as a brightest value for each of the three colors, red (R), green (G), and blue (blue). Hereinafter, the RGB components are mentioned in a square bracket, such as [R, G, B], for example, red [255, 0, 0], the darkest black [0, 0, 0], and the brightest white [255, 255, 255].

The reference colors of the reference color regions 11 to 14 are each a fixed color colored by a common color ink, i.e., each do not change unlike the sensor color. Although four reference colors are exemplified below, possible combinations of the reference colors are not limited thereto.

The reference color region 11 is covered with red [255, 0, 0].

The reference color region 12 is covered with green [0, 255, 0].

The reference color region 13 is covered with blue [0, 0, 255].

The reference color region 14 is covered with gray [200, 200, 200].

At least one (hereinafter, referred to as paint-out portion) of portions, i.e., the background portion of the reference color regions 11 to 14, the background portion of the sensor region 21, and the entire portion of the background region 30, may be beforehand painted out in white or black as a color different from the reference colors. This suppresses photographing of an image (color-saturated image) with blown-out highlights instead of perfect white [255, 255, 255] or blocked-up shadows instead of perfect black [0, 0, 0].

Any of the four reference colors is desirably darker than white to be painted out and brighter than black to be painted out. This eliminates occurrence of blown-out highlights or blocked-up shadows in the reference colors of the reference color regions 11 to 14 or in the sensor color of the sensor region 21 even if blown-out highlights or blocked-up shadows occurs in the paint-out portion.

Figure 4:
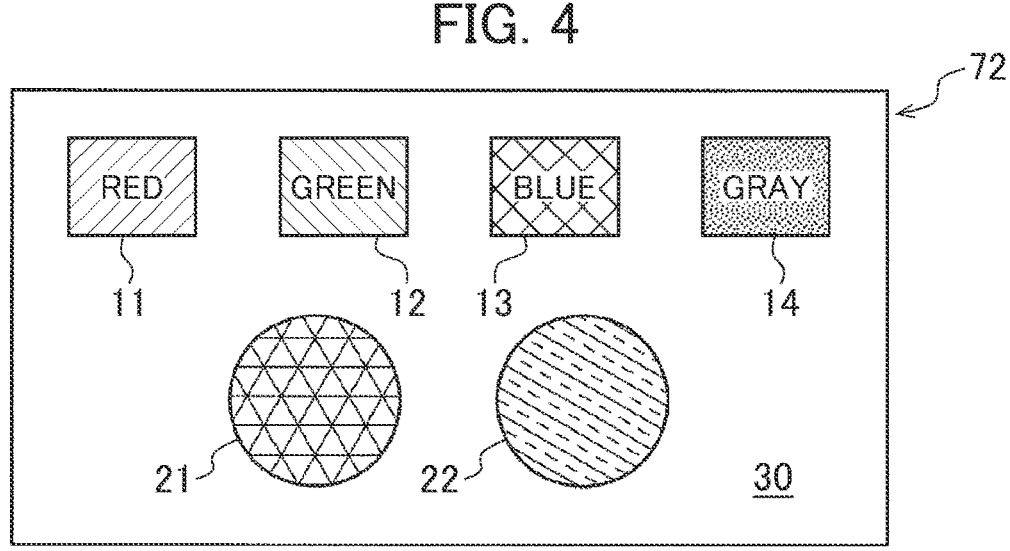
FIG. 4 illustrates an indication object including a second sensor region added to the indication object of FIG. 3 according to the embodiment of the invention.

FIG. 4 illustrates an indication object 72 including a second sensor region 22 added to the indication object 71 of FIG. 3. For example, one indication object 7 includes the sensor region 21 to measure temperature of a measurement object and a sensor region 22 to measure humidity of that measurement object, allowing simultaneous measurement of temperature and humidity.

The reference color regions 11 to 14 are used in common between the two sensor regions 21 and 22, which saves a measurement space and photograph time compared with a type in which an indication object 7 for temperature measurement and an indication object 7 for humidity measurement are separately prepared. Although any of the indication objects 7 other than the indication object 72 of FIG. 4 has been described to have one sensor region 21, the indication object 7 may have a plurality of sensor regions 21 and 22.

Figure 5:
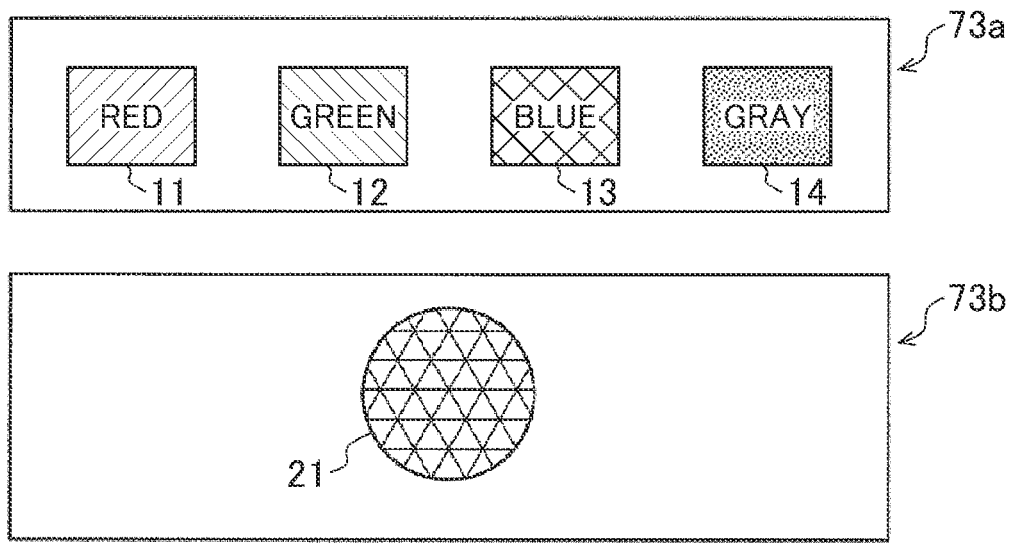
FIG. 5 illustrates an example, in which an indication object for reference color regions and an indication object for a sensor region are configured as separate media in the indication object of FIG. 3 according to the embodiment of the invention.

FIG. 5 illustrates an example, in which an indication object 73a for the reference color regions 11 to 14 and an indication object 73b for the sensor region 21 are configured as separate media in the indication object 71 of FIG. 3. The indication object 73b is placed on a thing or place to be measured in physical quantity for continuous measurement.

Another use of the indication object is assumed such that the indication object 73a and the photography equipment 5 are carried together, and are made close to each other to be photographed together during photography. This reduces area of the indication object 73b. Thus, even if the sensor region 21 is, for example, a color ink region handwritten in a small frame of an entry slip, the indication object 73b can be photographed in the same image as the image of the reference color regions 11 to 14.

Figure 6:
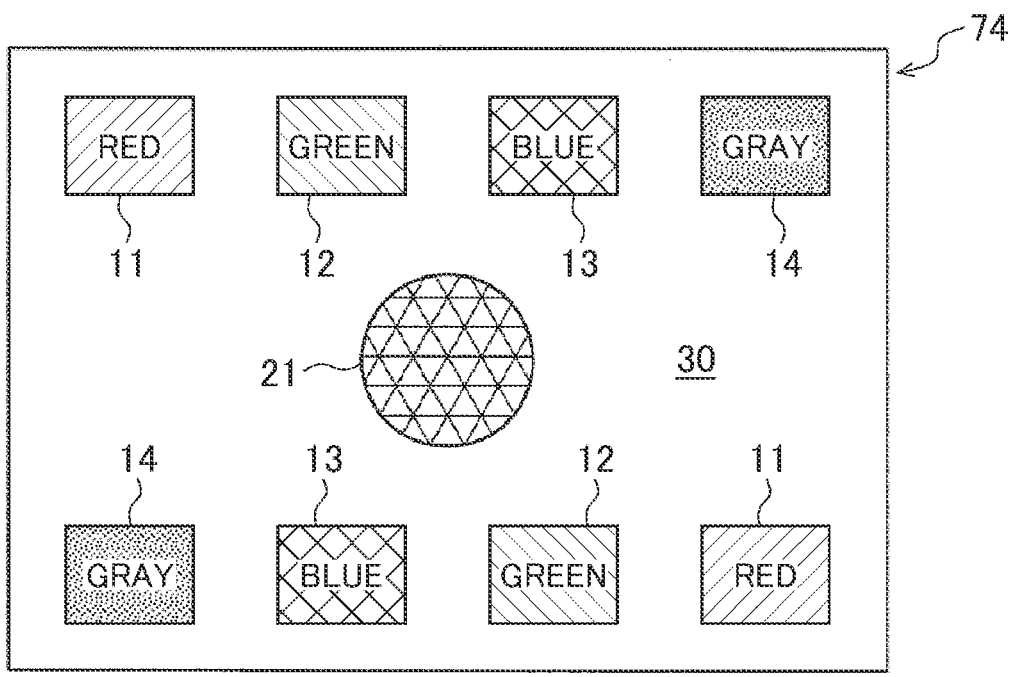
FIG. 6 illustrates an indication object including additional reference color regions provided both sides of the sensor region of the indication object of FIG. 3 according to the embodiment of the invention.

FIG. 6 illustrates an indication object 74 including additional reference color regions 11 to 14 provided across the sensor region 21 of the indication object 71 of FIG. 3.

Consequently, even if the illumination 8 is unevenly impinged on the indication object 74 and thus a difference between a bright portion and a dark portion exists, a reduction in correction accuracy of the sensor color can be suppressed by using the average of the reference photographed colors of the two reference color regions 11.

Further, as illustrated in FIG. 6, the reference color regions 11 of the same color can be disposed distant from each other to the utmost (disposed diagonally across the sensor region 21) to average the difference between the bright portion and the dark portion.

Through comparison between pieces of data of the same reference color in different places within the indication object 74, if a difference in data is extremely large, the calculation device 6 may determine bad impinging of the illumination 8 and determine photographing error.

If a light source is projected through reflection on a photographed image, the sensor color or the reference color is undesirably strongly affected thereby. Since such an image has a portion of strong reflected light and a portion of weak reflected light, the calculation device 6 can appropriately determine photographing error.

Figure 7:
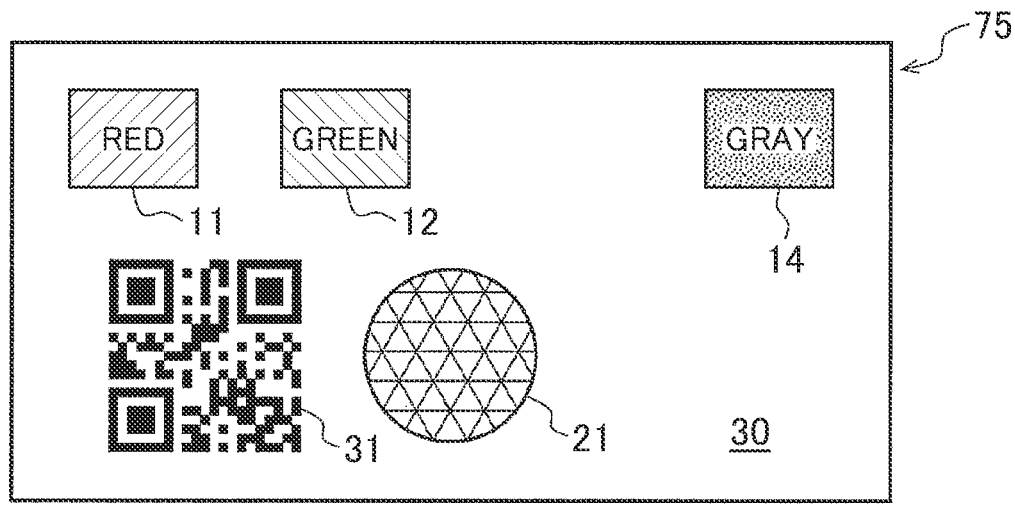
FIG. 7 illustrates an indication object including an information code provided on the indication object of FIG. 3 according to the embodiment of the invention.

FIG. 7 illustrates an indication object 75 including an information code 31 such as QR code (registered tradename) or barcode provided on the indication object 71 of FIG. 3 in place of the reference color covering the reference color region 13. This makes it possible to acquire not only the reference color as a color of the information code 31 itself but also embedded information preset in the indication object 75 from the photographed image of the information code 31. Examples of the embedded information include a type of a color model, such as an RGB model and HSV model, and a type of a color code of a reference standard color of that color model.

Figure 8:
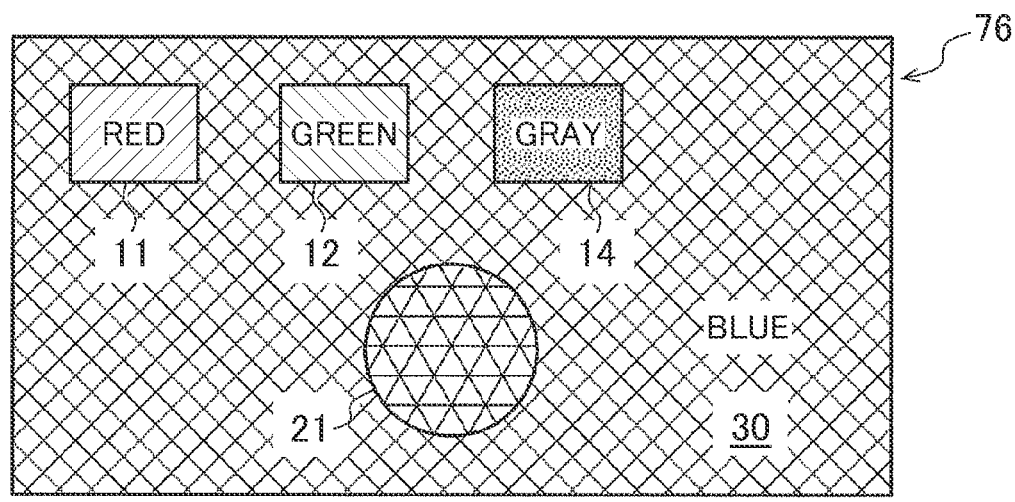
FIG. 8 illustrates an indication object including a third reference color covering a background region of the indication object of FIG. 3 in place of providing one of the reference color regions.

FIG. 8 illustrates an indication object 76 including a third reference color covering the background region 30 of the indication object 71 of FIG. 3 in place of providing the reference color region 13. This results in a state where the entire indication object 76 is covered with some color, which omits the reference color region 13 and saves area of the indication object 76.

FIG. 9 is a schematic illustration of a concept of color correction. In the RGB model, a color of a pixel is located somewhere within a three-dimensional RGB space (within a cube with one side 255 long) with the R axis, G axis, and B axis. In FIG. 9, the RGB space is simulatively represented by a two-dimensional graph for ease in illustration.

As a point on the graph goes to the lower left side, a color approaches the complete black [0, 0, 0], or is darkened. As the point goes to the upper right side of the graph, the color approaches the complete white [255, 255, 255], or becomes brighter.

As a requirement for determination of a type of each of the reference colors of the reference color regions 11 to 14, when reference standard colors C01 to C04 are represented by four points in the RGB space, all the four points are not contained in one plane. If the four points are contained in one plane, a combination of possible values of a plurality of conversion coefficients cannot be uniquely identified.

Further, enlarging volume of a tetrahedron formed by the four points in the RGB space increases accuracy of correction of the sensor color using the conversion coefficients.

A sensor color corrected through transformation such as rotation or translation of a space in a cube desirably comes within a range of the cube in the RGB space. For example, when a corrected color has a value of 280, the value is rounded into 255, and accuracy of the measured value is reduced due to such rounding.

As described above, all the four points are not contained in one plane, and the volume of the tetrahedron is sufficiently made large, thereby influence of illumination on the reference color and influence of illumination on the sensor color can be detected as the same photographed color, and thus an accurate conversion coefficient can be determined.

Hereinafter, a reference color photographed in a standard photography environment (first photography environment) is referred to as "reference standard color", and a reference color photographed in a photography environment (second photography environment) for actual measurement is referred to as "reference photographed color".

For example, a standard photography environment is designed such that a specific photography equipment 5 and a specific light source of the illumination 8 are used to beforehand photograph the indication object 7 at a distance from the illumination 8, an angle, and a photographic field angle that are reproducibly determined. The specific photography equipment 5 is preferably the same equipment as the equipment used in actual measurement or a similar type of equipment providing similar image quality. An image is importantly photographed by a specifiable type of equipment and reproducible. A reference standard color C01 is assumed to be photographed at the reference color region 11. The reference standard color is desirably photographed such that the indication object 7 is illuminated only by artificial illumination in an environment without natural light because environment can be reproduced thereby. At this time, color light of the illumination 8 is desirably close to white light. When a photographed color is corrected based on a standard color obtained under the most common white light, the correction amount can often be decreased, and thus color correction would be less disabled by excessive correction amount.

Subsequently, the indication object 7 is photographed in a photography environment for actual measurement (simple photography equipment 5 such as smartphone or car interior in which a light source of the illumination 8 is continuously moved). Here, a reference photographed color C1 is assumed to be photographed at the reference color region 11.

For other reference color regions 12 to 14, it is also assumed that the reference standard color C02 is photographed as a reference photographed color C2, the reference standard color C03 is photographed as a reference photographed color C3, and the reference standard color C04 is photographed as a reference photographed color C4.

Since the photography environment for actual measurement is brighter than the standard photography environment, the reference photographed color C1 is photographed more brightly than the reference standard color C01 (broken-line arrow toward the upper right in FIG. 9).

The sensor colors of the sensor regions 21 and 22 (see FIG. 4) are also affected by the photography environment as with the reference colors of the reference color regions 11 to 14, and thus are photographed more brightly than the standard sensor colors. Hereinafter, the sensor color photographed in the photography environment for actual measurement is referred to as "sensor photographed color", and the sensor color corrected as if being photographed in the standard photography environment is referred to as "sensor corrected color".

If a sensor photographed color C8 is directly converted to a physical quantity, the physical quantity is output while being larger (brighter) than actual measurement data. Thus, the sensor photographed color C8 needs to be corrected into a sensor corrected color C08 (in other words, returned into the standard photography environment) before being converted to the physical quantity (solid line arrow toward the lower left in FIG. 9). The sensor photographed color C9 also needs to be returned to a sensor corrected color C09 before being converted to the physical quantity.

Since the reference color and the sensor color are photographed in the same photographed image, both the colors can be considered to be affected by the same photography environment. Thus, the change amount (conversion coefficient) from the reference standard color C01 indicated by the broken-line arrow toward the upper right in FIG. 9 to the reference photographed color C1 is directly reversely applied to the corrected amount (solid line arrow toward the lower left in FIG. 9) from the sensor photographed color C8 to the sensor corrected color C08, thereby the sensor corrected color C08 can be indirectly obtained.

Figure 10:
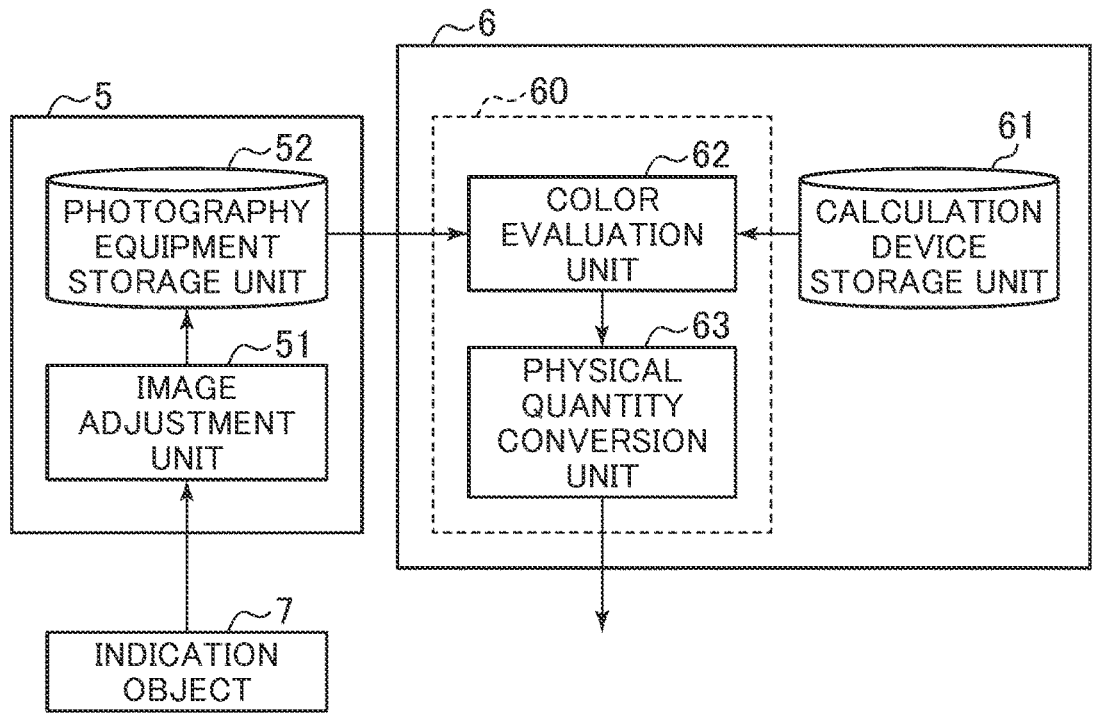
FIG. 10 is a block diagram illustrating details of the color evaluation system according to the embodiment of the invention.

FIG. 10 is a block diagram illustrating details of the color evaluation system.

The photography equipment 5 of the color evaluation system includes an image adjustment unit 51 and a photography equipment storage unit 52.

The image adjustment unit 51 adjusts the photographed image of the indication object 7 photographed by the photography equipment 5 as the second photography environment, and stores an image file converted into an image format such as JPG. Such image adjustment includes gamma correction processing and white balance adjustment processing as described later. The image format is described assuming data of each color corresponds to one byte, or 8 bits (having values from 0 to 255), but may be represented by a larger number of bits.

Any of image formats other than JPG, such as PNG, TIF, and BMP, may be used. However, an image format with a small number of bits reduces accuracy of data, and thus a preferable format represents each of the RGB components of a pixel by one byte or more.

The calculation device 6 of the color evaluation system includes a calculation device storage unit 61, and a color evaluation unit 62 serving as a processing unit 60, and a physical quantity conversion unit 63. The calculation device 6 includes a computer including a central processing unit (CPU), a memory, and storage means (calculation device storage unit 61) such as a hard disc. In the computer, the CPU executes a program (application or smartphone app) read in the memory to operate a control unit (control means) configured of components of the processing unit 60.

The calculation device storage unit 61 stores various data used by the processing unit 60, such as color data of the reference standard colors C01 to C04 photographed in the first photography environment. The color data of the reference standard colors C01 to C04 are stored (prestored) in the calculation device storage unit 61 before photography by the photography equipment 5.

The color evaluation unit 62 addresses an image photographed in the second photography environment, which is transmitted from the photography equipment storage unit 52 of the photography equipment 5 to the calculation device 6, and corrects the sensor photographed colors C8 and C9 to the sensor corrected colors C08 and C09 based on the amount of change from the reference standard colors C01 to C04 to the reference photographed colors C1 to C4. The correction processing of the color evaluation unit 62 can be implemented with a common logic independently of a type of the physical quantity measured by the color sensor. The processing of the color evaluation unit 62 is described in detail later with FIG. 11.

The physical quantity conversion unit 63 converts the sensor corrected color output by the color evaluation unit 62 to a corresponding physical quantity (temperature for a temperature sensor, humidity for a humidity sensor).

A configuration may be used in place of the configuration in which the calculation device 6 includes all components of the processing units 60. In such a configuration, one component (for example, the color evaluation unit 62) of the processing unit 60 is provided in a programmable photography equipment 5 such as a smartphone, and the other component (for example, the physical quantity conversion unit 63) of the processing unit 60 is provided in the calculation device 6. A single smartphone may have both the functions of the photography equipment 5 and the calculation device 6.

This extremely reduces the transfer data amount and reduces communication time compared with a system in which the calculation device 6 includes all components of the processing units 60, and photographed image data are transferred from the photography equipment 5 to the calculation device 6.

Figure 11:
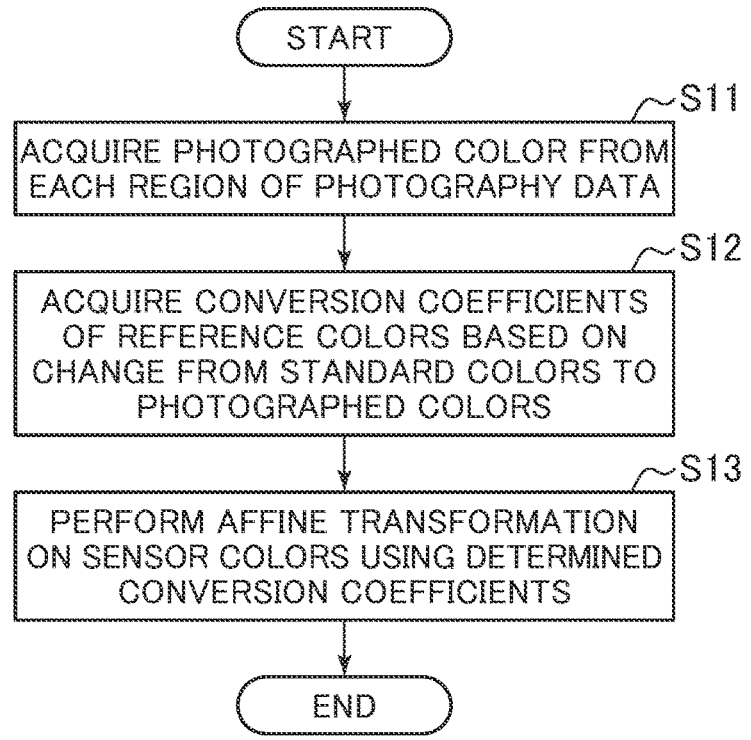
FIG. 11 is a flowchart illustrating operation of a color evaluation unit according to the embodiment of the invention.

FIG. 11 is a flowchart illustrating operation of the color evaluation unit 62.

In S11, the color evaluation unit 62 receives photography data from the photography equipment storage unit 52, and acquires a photographed color (reference photographed color, sensor photographed color) from each of the regions of the indication object 7 photographed in the photography data. The color evaluation unit 62 reads color information of each of pixels allocated for each region depending on area, and extracts the average of such pieces of color information as a typical value of the region.

In S12, the color evaluation unit 62 determines conversion coefficients of reference colors from the change amount from the prestored four reference standard colors (four reference standard colors C01 to C04 explained with FIG. 9) to the four reference photographed colors photographed in S11 (four reference photographed colors C1 to C4 explained in FIG. 9). Equations 1 to 3 are each a relational expression between left-hand reference photographed colors C1 to C4 and right-hand reference standard colors C01 to C04.

Numerical Formula 1

$$\begin{pmatrix} R_1 & G_1 & B_1 & 1 \\ R_2 & G_2 & B_2 & 1 \\ R_3 & G_3 & B_3 & 1 \\ R_4 & G_4 & B_4 & 1 \end{pmatrix} \begin{pmatrix} a_{11} \\ a_{12} \\ a_{13} \\ b_1 \end{pmatrix} = \begin{pmatrix} R_{01} \\ R_{02} \\ R_{03} \\ R_{04} \end{pmatrix} \quad \text{Equation 1}$$

$$\begin{pmatrix} R_1 & G_1 & B_1 & 1 \\ R_2 & G_2 & B_2 & 1 \\ R_3 & G_3 & B_3 & 1 \\ R_4 & G_4 & B_4 & 1 \end{pmatrix} \begin{pmatrix} a_{21} \\ a_{22} \\ a_{23} \\ b_2 \end{pmatrix} = \begin{pmatrix} G_{01} \\ G_{02} \\ G_{03} \\ G_{04} \end{pmatrix} \quad \text{Equation 2}$$

$$\begin{pmatrix} R_1 & G_1 & B_1 & 1 \\ R_2 & G_2 & B_2 & 1 \\ R_3 & G_3 & B_3 & 1 \\ R_4 & G_4 & B_4 & 1 \end{pmatrix} \begin{pmatrix} a_{31} \\ a_{32} \\ a_{33} \\ b_3 \end{pmatrix} = \begin{pmatrix} B_{01} \\ B_{02} \\ B_{03} \\ B_{04} \end{pmatrix} \quad \text{Equation 3}$$

Twelve conversion coefficients in total in Equations 1 to 3 include nine variables a11 to a33 indicating scaling, rotation, and shear of affine transformation as coordinate transformation in a three-dimensional space, and three variables b1 to b3 indicating translation of affine transformation. The color evaluation unit 62 solves simultaneous linear equations with four variables, in which the reference photographed colors C1 to C4 and the reference standard colors C01 to C04 are substituted into Equations 1 to 3, and thus determines the twelve conversion coefficients.

In S13, the color evaluation unit 62 uses the twelve conversion coefficients determined in S12 to correct the sensor photographed colors to the sensor corrected colors (affine transformation). Equation 4 is a relational expression between the sensor corrected color C08 on the left side, and the sensor photographed color C8 and the twelve conversion coefficients determined in S12 on the right side. The twelve conversion coefficients include nine variables a11 to a33 as coefficients for the sensor photographed color C8 and the three variables b1 to b3 indicating translation of affine transformation.

Numerical Formula 2

$$\begin{pmatrix} R_C \\ G_C \\ B_C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} + \begin{pmatrix} b_1 \\ b_2 \\ b_3 \end{pmatrix} \quad \text{Equation 4}$$

Sensor photographed colors = $[R, G, B]$
Sensor corrected colors = $[R_C, G_C, B_C]$ The color evaluation unit 62 solves an equation, in which the sensor photographed color C8 and the twelve conversion coefficients are substituted into Equation 4, and thus obtains the sensor corrected color C08. When the second sensor color exists in the sensor region 22 as illustrated in FIG. 4, the color evaluation unit 62 corrects the second sensor color using the twelve conversion coefficients and Equation 4 as with the first sensor color.

Equation 5, which is shown as a comparative example, is a relational expression between the sensor corrected color C08 on the left side, and the sensor photographed color C8 and the nine conversion coefficients on the right side. In the relational expression of Equation 4, the three variables b1 to b3 are added as a second term to the relational expression of Equation 5 so that influence of the illumination 8 and the photography equipment 5 is eliminated and accuracy of color correction is improved. In the case of using only three reference colors, since only up to nine conversion coefficients can be determined, the color correction using Equation 5 is the possible best correction.

Numerical Formula 3

$$\begin{pmatrix} R_C \\ G_C \\ B_C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad \text{Equation 5}$$

The color evaluation unit 62 stores the sensor corrected color C08 obtained in S13 into the calculation device storage unit 61. The physical quantity conversion unit 63 converts the sensor corrected color C08 into a physical quantity represented by that color, and stores the conversion result as a measured value of the physical quantity into the calculation device storage unit 61. The measured value may be output to a display screen of the photography equipment 5 being a smartphone.

Description has been given with reference to FIGS. 1 to 11 on how the color evaluation unit 62 improves accuracy of the sensor color correction by using the calculation formula additionally having the fourth reference color and a term representing translation of affine transformation. Description is now given with reference to FIG. 12 on a configuration where a fifth reference color and a sixth reference color are further added to the indication object 7 to improve accuracy of sensor color correction.

First, influence of equipment type dependence of the photography equipment 5 on image data is described with exemplary gamma correction by the image adjustment unit 51 for generation of the image data. The photography equipment 5 performing photography through digital processing often generates a dark image due to properties of its imaging element when linearly processing an obtained raw signal to generate color data. The image adjustment unit 51 thus performs gamma correction before generating image data in the JPG format, for example.

However, since such gamma correction is adjusted with an original idea of a manufacturer of the photography equipment 5 such that a user feels natural brightness, the amount of the gamma correction or details of the correction curve varies/vary depending on equipment types. Such a difference in gamma correction contents depending on an equipment type is an example of the equipment type dependence of the photography equipment 5.

If the same gamma correction is applied to both the reference standard color and the reference photographed color, the gamma correction need not be necessarily returned back. Considering gamma correction for color correction of the sensor color makes it possible to absorb a difference in gamma correction amount between equipment types, eliminate equipment type dependence over the entire range from a dark color to a bright color as much as possible, and improve accuracy of color correction.

Figure 12:
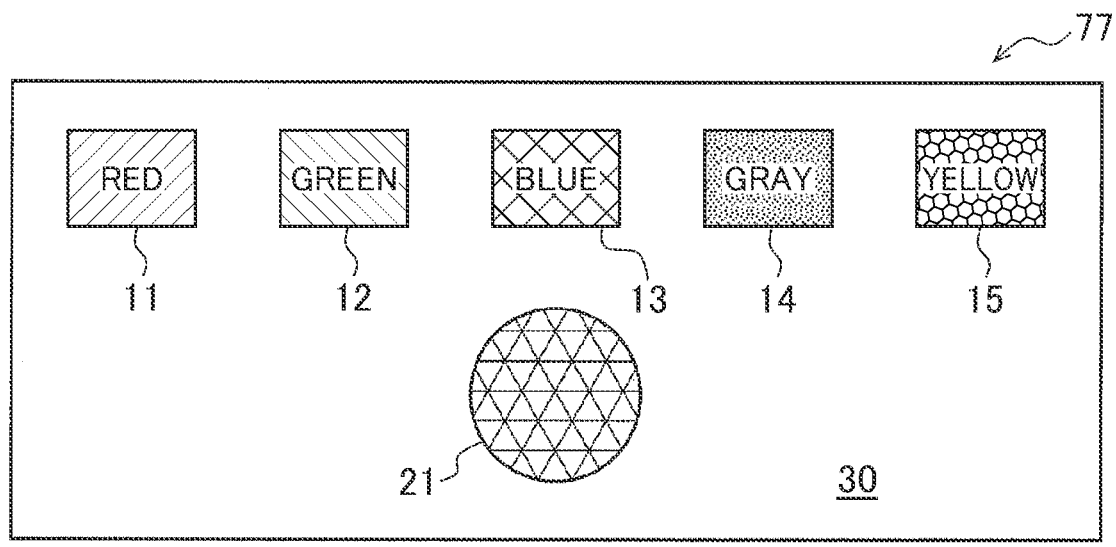
FIG. 12 illustrates an example of using five reference colors for color correction in consideration of gamma correction according to the embodiment of the invention.

FIG. 12 illustrates an example of using five reference colors for color correction in consideration of gamma correction. An indication object 77 further includes a fifth reference color region 15 added to the indication object 71 of FIG. 3.

The γ coefficient for gamma correction may be "single γ coefficient" as a value common to all the RGB components or "color-specific γ coefficient" as an individual value for each of the RGB components. A case of using the color-specific γ coefficient is now described.

Equation 6 includes relational expressions representing that a result of conversion (gamma correction) of data values of the sensor photographed color C8 using the color-specific γ coefficients is defined as sensor γ-corrected colors. The denominator "F" in Equation 6 represents the maximum of the color data, and F=255 is given in a typical case where a color is expressed by one byte.

Numerical Formula 4

$$\left. \begin{array}{l} R_\alpha = F\left(\dfrac{R}{F}\right)^{\gamma_R} \\ G_\alpha = F\left(\dfrac{G}{F}\right)^{\gamma_G} \\ B_\alpha = F\left(\dfrac{B}{F}\right)^{\gamma_B} \end{array} \right\} \quad \text{Equation 6}$$

Sensor γ − corrected colors = $[R_\alpha, G_\alpha, B_\alpha]$
Color − specific γ coefficients = $[\gamma_R, \gamma_G, \gamma_B]$ The color evaluation unit 62 must determine fifteen conversion coefficients in total to determine the twelve conversion coefficients described with Equations 1 to 3, and determine three color-specific γ coefficients (for the respective R component, G component, and B component) in Equation 6 by a nonlinear equation.

Equation 7 converts the sensor γ-corrected color in Equation 6 to the sensor corrected color C08. In Equation 7, the sensor γ-corrected color replaces the sensor photographed color C8 in Equation 4.

Numerical Formula 5

$$\begin{pmatrix} R_C \\ G_C \\ B_C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R_\alpha \\ G_\alpha \\ B_\alpha \end{pmatrix} + \begin{pmatrix} b_1 \\ b_2 \\ b_3 \end{pmatrix} \quad \text{Equation 7}$$

Since any equipment type performs correction for good looking, a difference in color-specific γ coefficient is often small between equipment types. In such a case, any of the three appropriate values of the color-specific γ coefficients to be determined by Equation 7 is very close to 1. When γ=1 is defined to correspond to no gamma correction and γ is set to a value slightly larger or smaller than 1, a difference in intermediate tone between equipment types can be corrected.

Although the color evaluation unit 62 probably determines the fifteen conversion coefficients by a plurality of methods, since the appropriate value of γ to be used is assumed to be very close to 1, an algorithm described in the following steps 1 to 5 is considered as an example.

Step 1: [γR=1, γG=1, γB=1] are set as initial values of the color-specific γ coefficients.

Step 2: Equation 6 and Equation 7 are applied to the first to fourth reference colors, and thus equations for the nine variables a11 to a33 and three variables b1 to b3 are obtained and solved to determine such twelve conversion coefficients. The color-specific γ coefficients are treated as predetermined values.

Step 3: Values are substituted into the twelve conversion coefficients determined in the step 2, and Equations 6 and 7 are applied to the fifth reference color to set up three equations for the color-specific γ coefficients. The color-specific γ coefficients are treated as variables to be obtained, and the values used in the step 2 are not used. Solutions of the three variables can be easily obtained. The solutions are referred to as [ΓR, ΓG, ΓB].

Step 4: If [ΓR−γR, ΓG−γG, ΓB−γB] are all sufficiently close to 0, the variables are considered to be converged. Step 5: If the variables are not converged, new color-specific γ coefficients [γRnew, γGnew, γBnew] are calculated, and the algorithm is returned to the step 2 and the above steps are repeated.

γRnew=γR+β(ΓR−γR)

γGnew=γG+β(ΓG−γG)

γBnew=γB+β(ΓB−γB)

β is a mixing coefficient and set to a value within a range of 0<β≤1. Large β results in large variation and thus may cause conversion at low loop frequencies, but may result in excessive variation causing vibration and thus may cause an indefinitely unconvergent event. Small β often results in high loop frequencies necessary for convergence, but expectedly suppresses the vibration phenomenon and increases a possibility of convergence.

When the algorithm is started at a solution sufficiently close to a convergence value, calculation can often be converged by such a simple repeated calculation.

Description has been given on a method in which an individual color-specific γ coefficient is determined to perform gamma correction for each of the RGB components.

In some method, gamma correction is performed using only one γ coefficient. Actually, gamma correction is often performed using a single γ coefficient for correcting brightness of an image. The fifth reference color is also necessary for the gamma correction using the single γ coefficient. However, the sensor γ-corrected color is calculated using only the single γ coefficient as in Equation 8 instead of Equation 6.

Numerical Formula 6

$$R_\alpha = F\left(\frac{R}{F}\right)^\gamma \\ G_\alpha = F\left(\frac{G}{F}\right)^\gamma \\ B_\alpha = F\left(\frac{B}{F}\right)^\gamma$$

Equation 8

Sensor γ coefficients = [γ, γ, γ,]

If the single γ coefficient is applied to the algorithm of the steps 1 to 5 for determining the color-specific γ coefficients, three equations appear for the single γ coefficient in the step 3. All the three equations generally cannot be completely satisfied.

Hence, the single γ coefficient is necessary to be approximately determined such that a difference in color (brightness) is probably smallest. One possible method is as follows. For example, luminance Y is defined as Y=0.299R+ 0.587G+0.114B in a format called YUV in some method. Using this, three equations for the single γ coefficient are added together with weights of the above coefficients, and the single γ coefficient is determined by Equation 9.

Numerical Formula 7

$$(0.299 \; 0.587 \; 0.114)\begin{pmatrix} R_C \\ G_C \\ B_C \end{pmatrix} = \\ (0.299 \; 0.587 \; 0.114)\left[\begin{pmatrix} a_{11} & a_{12} & a_{13} \\ a_{21} & a_{22} & a_{23} \\ a_{31} & a_{32} & a_{33} \end{pmatrix}\begin{pmatrix} R_\alpha \\ G_\alpha \\ B_\alpha \end{pmatrix} + \begin{pmatrix} b_1 \\ b_2 \\ b_3 \end{pmatrix}\right]$$

Equation 9

Since Equation 9 is used in the step 3, the nine variables a11 to a33 and the three variables b1 to b3 are treated as predetermined values. Since the single γ coefficient is contained in the sensor γ-corrected color, the step 3 can be executed by solving Equation 9 for the single γ coefficient. Since Equation 9 is a nonlinear equation showing the sum of powers of γ of different bases, a solution of Equation 9 is slightly complicated compared with a case of determining the color-specific γ coefficient, but Equation 9 can be numerically solved by a typical solution such as the Newtonian method or a dichotomy because of only one variable.

The method of converting the color image represented by the RGB components to a gray scale includes a plurality of methods including not only the above-described method for obtaining the luminance Y, but also a method of setting the color-specific γ coefficients to [0.2126, 0.7152, 0.0722] or a method of setting the single γ coefficient to [⅓, ⅓, ⅓]. The vector of conversion coefficients multiplied from the left to both sides of Equation 9 can be replaced with such coefficients to easily change a brightness evaluation method.

In another method for determining the single γ coefficients, the three equations are directly used to independently determine the color-specific γ coefficients in the step 3, and then the single γ coefficients are determined with the averages of the color-specific γ coefficients or with a beforehand set weighted mean.

Only a simple function form of an intermediate color, which swells to either a bright side or a dark side, does not always allow sufficient correction to absorb a difference in gamma correction between an equipment photographing standard color data and an equipment photographing reference color data. In some case, correction is necessary to be performed by an s-shape function form that swells to a bright side for a darkish intermediate color while swelling to a dark side for a brightish intermediate color.

A sixth reference color is further introduced in case of considering correction by the s-shape function form. In such a case, a correction formula of the sensor photographed color C8 corresponding to Equation 6 is defined using two variables for each color so that a correction curve may have an s shape. Only two common variables may be used instead of using two independent variables for each of the RGB components, i.e., six variables in total.

As a step of determining the six or two variables introduced herein in addition to the nine variables a11 to a33 and the three variables b1 to b3, the above-described algorithm for obtaining γ is extended so as to be applied to the new variables. Although such an algorithm repeating a loop may slightly deteriorate in convergence due to the increased variables, if the convergence is deteriorated to the extent of a practical problem, the function form is modified, or a method of using only two variables instead of the six variables is employed.

For gamma correction, the reference color data, which is obtained by photographing the reference color region and taking the average, is also preferably recorded in the photography equipment storage unit 52. Since a plurality of methods as described herein are considered for gamma correction, if a combination of the reference color data and color data of the color sensor is recorded, it is possible to use another correction method later and reexamine a most appropriate color correction method.

Since which four reference colors are used for color correction and which reference color is used for gamma correction from among the five or more reference colors may be optionally determined, a combination of such reference colors can be changed for color correction. Although the reference color for gamma correction desirably has an intermediate brightness, two or more reference colors having such a brightness may exist in the five or more reference colors.

Color correction by a plurality of methods is used to verify accuracy of the color correction later. In addition, the color correction may be used to perform evaluation by a plurality of color correction methods from the beginning and determine corrected values with an average or a predetermined weighted mean This may provide stable color evaluation in more situations.

Description has been given on equipment type dependence of the photography equipment 5 given to image data by gamma correction. Automatic white balance is one cause of equipment type dependence of the photography equipment 5 when the image adjustment unit 51 stores the image data into the photography equipment storage unit 52.

The automatic white balance is processing of automatically calculating a range of a value segmented from raw data so as to form an image having appropriate brightness, and automatically adjusting color balance such that influence of the illumination 8 is eliminated as much as possible and a white object is photographed white.

At this time, since a camera has no accurate information on a spectrum of a light source at the moment of photographing, the automatic white balance merely adjusts a color based on only contents of an image such that many people feel a natural color image. A method of such adjustment is set for each equipment type with an original idea of a camera manufacturer, and thus even if the same object is photographed at the same moment, color data of a produced image varies depending on equipment types.

Specifically, the automatic white balance cannot completely eliminate influence of the illumination 8, and camera type dependence necessarily remains in the color data produced by photography. Furthermore, image quality adjustment is often added with an original idea of a camera manufacturer, and enhancement of color vividness or brightening a skin color is also frequently performed, leading to large equipment type dependence of the color data.

For such automatic white balance, the reference colors of the indication object 7 are photographed simultaneously with the sensor region 21 while the number of the reference colors is increased as with gamma correction, which eliminates equipment type dependence of the photography equipment 5 and increases accuracy of color correction.

In the embodiment as described above, the fourth reference color is added to the indication object 7, and the color evaluation unit 62 calculates Equation 4 containing a term representing translation of affine transformation, so that even if the sensor color is a photographed color close to black, color correction can be achieved through appropriate translation.

Furthermore, as described with reference to FIG. 12, the fifth reference color is added to the indication object 7, and the color evaluation unit 62 adds influence of image adjustment processing such as gamma correction, thereby influence of type dependence of the photography equipment 5 can be eliminated, leading to accurate color evaluation.

The invention should not be limited to the above-described embodiment, and includes various modifications and alterations. For example, the above-described embodiment has been described in detail to clearly explain the invention, and the invention is not necessarily limited to the embodiment having all the described configurations.

In addition, part of a configuration of one embodiment can be substituted for a configuration of another embodiment, and a configuration of one embodiment can be added to a configuration of another embodiment.

Furthermore, a configuration of one embodiment can be added to, eliminated from, or substituted for part of a configuration of another embodiment. The above-described configurations, functions, processing sections, and/or processing means may be partially or entirely achieved by hardware, for example, by designing with an integrated circuit.

The configurations or the functions may be achieved by software with a processor that interprets and executes a program to implement relevant functions.

The information such as the program to implement the functions, a table, and a file can be stored in a recording device such as a memory, a hard disc, and a solid state drive (SSD), or a recording medium such as an integrated circuit (IC) card, an SD card, and a digital versatile disc (DVD).

The illustrated control lines and information lines are those considered to be necessary for explanation, and all control lines and information lines for a product are not necessarily shown. Almost all configurations may be considered to be actually connected to one another.

Furthermore, communication means connecting between the devices is not limited to wireless LAN, and may be wired LAN or other communication means.

An example providing a high color correction effect is now described as a method for indicating a reference color. Actual environment for photographing a color sensor is not merely different in type of a light source but is often different in light impinging depending on places. Brightness may be uneven in case where brightness has gradient, for example, in case where an indication object containing a color sensor has one side being bright and the other side being dark, or may be uneven because of partial shadowing. A long distance between the sensor region and the reference color region may lead to insufficient color correction due to such uneven brightness.

The sensor region and the reference color region are most preferably arranged in contact with each other to minimize a possibility of such insufficient color correction. Furthermore, two identical reference color regions are disposed across the sensor region, and the average of colors of the reference color regions is used as a reference color, thereby even if the entire indication object has a uniform brightness gradient, an error from such a gradient can be cancelled as much as possible.

Figure 13:
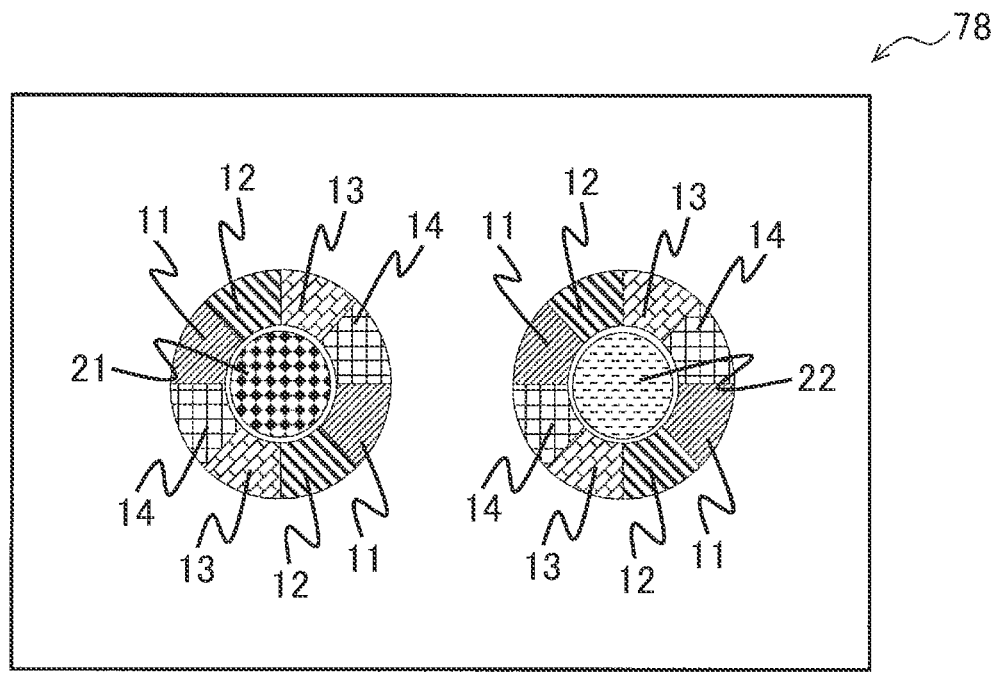
FIG. 13 is a schematic illustration of an indication method providing a high color correction effect according to the embodiment of the invention.

FIG. 13 illustrates an exemplary arrangement providing such a high color correction effect. In an indication object 78, eight reference color regions (two sets of reference color regions 11 to 14) encompass (are disposed in contact with) each of the sensor regions 21 and 22, and each of four reference colors is disposed at two point-symmetric positions. For example, the respective reference color regions 11 having the same color are disposed on the upper left side and the lower right side of the sensor region 21.

LIST OF REFERENCE SIGNS

5 Photography equipment
6 Calculation device
7 Indication object
8 Illumination
11 to 15 Reference color region
21, 22 Sensor region
30 Background region
31 Information code
51 Image adjustment unit
52 Photography equipment storage unit
60 Processing unit
61 Calculation device storage unit
62 Color evaluation unit
63 Physical quantity conversion unit
71, 72, 73a, 73b, 74 to 78 Indication object

The invention claimed is:

1. A color evaluation device, comprising a color evaluation unit and a storage unit, wherein
the storage unit stores color information of four or more reference colors photographed in a first photography environment, and
the color evaluation unit
acquires a sensor color of a color sensor, the sensor color changing depending on a physical quantity to be measured, and the four or more reference colors, the reference colors being unaffected by the physical quantity, from photography data at measurement obtained by photographing an indication object indicating the sensor color and the four or more reference colors in a second photography environment,
determines conversion coefficients of colors between the first and second photography environments based on the amount of change from the color information of the four or more reference colors in the first photography environment read from the storage unit to the color information of the four or more reference colors in the second photography environment acquired from the photography data, and calculates a conversion formula including a term representing translation of affine transformation based on the sensor color acquired from the photography data at measurement and the color conversion coefficient to correct the sensor color as if being photographed in the first photography environment, and when the four or more reference colors indicated on the indication object are respectively represented by coordinates in a color space configured of a combination of parameters representing colors, the four or more reference colors are determined so as not to be contained in the same plane.

2. The color evaluation device according to claim 1, wherein when acquiring the sensor color and the four or more reference colors from the photography data at measurement, the color evaluation unit reads the information code indicated on the indication object together, and uses the information code in subsequent processing of determining conversion coefficients of the colors or processing of correcting the sensor color.

3. The color evaluation device according to claim 1, wherein in the processing of determining the conversion coefficients of the colors, the color evaluation unit also determines, from the reference colors, a conversion coefficient of a color indicating image adjustment processing applied on photography data in each of the first and second photography environments.

4. A color evaluation method, in which a color evaluation device includes a storage unit and a color evaluation unit, wherein the storage unit stores color information of four or more reference colors photographed in a first photography environment, and the color evaluation unit acquires a sensor color of a color sensor, the sensor color changing depending on a physical quantity to be measured, and the four or more reference colors, the reference colors being unaffected by the physical quantity, from photography data at measurement obtained by photographing an indication object indicating the sensor color and the four or more reference colors in a second photography environment, determines conversion coefficients of colors between the first and second photography environments based on the amount of change from the color information of the four or more reference colors in the first photography environment read from the storage unit to the color information of the four or more reference colors in the second photography environment acquired from the photography data, and calculates a conversion formula including a term representing translation of affine transformation based on the sensor color acquired from the photography data at measurement and the color conversion coefficient to correct the sensor color as if being photographed in the first photography environment.

5. The indication object used in the color evaluation method according to claim 4, the indication object comprising a sensor region in which the color sensor is indicated, and reference color regions in which the four or more reference colors are individually indicated.

6. The indication object according to claim 5, wherein a medium having the sensor region and a medium having the reference color regions are formed separately.

7. The indication object according to claim 5, wherein the reference color regions for the four or more reference colors are provided such that the reference color regions having the same color are provided at a plurality of places across the sensor region.

8. The indication object according to claim 5, wherein the sensor region in which the color sensor is indicated and the reference color regions for the respective reference colors are formed as closed regions, and a reference color different from any of the reference colors of the reference color regions is indicated over a background region belonging to no closed region.

9. The indication object according to claim 5, wherein the sensor region in which the color sensor is indicated and the reference color regions for the respective reference colors are formed as closed regions, and a white or black background color is indicated over a background region belonging to no closed region.

10. The indication object according to claim 5, wherein the reference color regions for the four or more reference colors are each disposed in contact with the sensor region, and the reference color regions having the same color are respectively provided at a plurality of places.

* * * * *